United States Patent
Renaudier et al.

(10) Patent No.: US 9,621,298 B2
(45) Date of Patent: Apr. 11, 2017

(54) METHOD OF OPTICAL DATA TRANSMISSION USING POLARIZATION DIVISION MULTIPLEXING AND QPSK

(71) Applicant: Alcatel Lucent, Boulogne Billancourt (FR)

(72) Inventors: Jeremie Renaudier, Nozay (FR); Oriol Bertran-Pardo, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/896,732

(22) PCT Filed: Jun. 6, 2014

(86) PCT No.: PCT/EP2014/061774
§ 371 (c)(1),
(2) Date: Dec. 8, 2015

(87) PCT Pub. No.: WO2014/206707
PCT Pub. Date: Dec. 31, 2014

(65) Prior Publication Data
US 2016/0134391 A1    May 12, 2016

(30) Foreign Application Priority Data

Jun. 28, 2013  (EP) .................... 13305924

(51) Int. Cl.
*H04B 10/00* (2013.01)
*H04J 14/06* (2006.01)
(Continued)

(52) U.S. Cl.
CPC .......... *H04J 14/06* (2013.01); *H04B 10/5053* (2013.01); *H04B 10/5561* (2013.01); *H04L 7/0075* (2013.01)

(58) Field of Classification Search
USPC ................................................ 398/182–201
See application file for complete search history.

(56) References Cited

U.S. PATENT DOCUMENTS 6,389,079 B2 * 5/2002 Raheli .................... H04B 7/005
                                                        375/262
8,073,338 B2 * 12/2011 Buelow ................ H04B 10/505
                                                        398/184
(Continued)

FOREIGN PATENT DOCUMENTS

EP    2506458    10/2012
EP    2506459    10/2012
(Continued)

OTHER PUBLICATIONS

Renaudier, J. et al; Experimental Transmission of Nyquist Pulse Shaped 4-D Coded Modulation using Dual Solarization 16QAM Set-Partitioning Schemes at 28 Gbaud; Optical Fiber Communication Conference and Exposition and the National Fiber Optic Engineers Conference (OFC/NFOEC); 2013, IEEE, Mar. 17, 2013; pp. 1-3; KP032427203; ISBN: 978-1-4799-0457-0.
(Continued)

*Primary Examiner* — Agustin Bello
(74) *Attorney, Agent, or Firm* — Patti & Malvone Law Group, LLC (57) ABSTRACT

Proposed is a method of optical data transmission. The method comprises different steps. At least one stream of data bits is received. Sets of data bits are mapped onto successive logical states. The logical states correspond to respective sets of two initial QPSK symbols chosen according to a QPSK mapping and according to a set partitioning rule. The logical states are differentially encoded according to a differential encoding rule. For the differentially encoded logical states respective sets of two resulting QPSK symbols are derived according to the QPSK mapping and according (Continued)

to the set partitioning rule. The encoded sets of two QPSK symbols are transmitted using polarization division multiplexing. The differential encoding rule results in a differential encoding of one of the initial QPSK symbols but not the other of the initial QPSK symbols.

10 Claims, 11 Drawing Sheets (51) Int. Cl.
*H04B 10/50* (2013.01)
*H04B 10/556* (2013.01)
*H04L 7/00* (2006.01)

(56) References Cited

U.S. PATENT DOCUMENTS

| | | | | |
|---|---|---|---|---|
| 9,337,934 | B1* | 5/2016 | Agazzi | H04B 10/61 |
| 9,419,720 | B2* | 8/2016 | Akiyama | G02F 1/0123 |
| 2008/0025733 | A1* | 1/2008 | Nazarathy | H04B 10/677 |
| | | | | 398/209 |
| 2008/0240729 | A1* | 10/2008 | Toyoda | H04B 10/5055 |
| | | | | 398/163 |
| 2010/0080571 | A1* | 4/2010 | Akiyama | G02F 1/0123 |
| | | | | 398/184 |
| 2011/0274436 | A1* | 11/2011 | McNicol | H04B 10/5561 |
| | | | | 398/140 |
| 2012/0321303 | A1* | 12/2012 | Zhang | H04B 10/532 |
| | | | | 398/45 |
| 2013/0070785 | A1* | 3/2013 | Liu | C02F 1/78 |
| | | | | 370/464 |
| 2013/0084069 | A1* | 4/2013 | Feuer | H04J 13/0003 |
| | | | | 398/65 |
| 2013/0108276 | A1* | 5/2013 | Kikuchi | H04B 10/677 |
| | | | | 398/158 |
| 2013/0177316 | A1* | 7/2013 | Cardakli | H04J 14/06 |
| | | | | 398/79 |
| 2013/0251379 | A1* | 9/2013 | Hueda | H04B 10/60 |
| | | | | 398/208 |
| 2014/0079406 | A1* | 3/2014 | Mo | H04B 10/516 |
| | | | | 398/140 |
| 2014/0161470 | A1* | 6/2014 | Zelensky | H04B 10/2569 |
| | | | | 398/208 |
| 2014/0363173 | A1* | 12/2014 | Dave | H04B 10/25137 |
| | | | | 398/149 |
| 2015/0188642 | A1* | 7/2015 | Sun | H04J 14/02 |
| | | | | 398/202 |
| 2015/0365174 | A1* | 12/2015 | Nazarathy | H04L 25/03019 |
| | | | | 398/209 |
| 2016/0006538 | A1* | 1/2016 | Yoshida | H04B 10/532 |
| | | | | 398/65 |
| 2016/0134391 | A1* | 5/2016 | Renaudier | H04B 10/5053 |
| | | | | 398/65 |

FOREIGN PATENT DOCUMENTS

| | | |
|---|---|---|
| EP | 2571217 | 3/2013 |
| JP | 2005184103 | 7/2005 |
| JP | 2014183532 | 9/2014 |
| JP | 2016519857 | 7/2016 |

OTHER PUBLICATIONS

Renaudier, J. et al; Generation and Detection of 28 Gbaud Polarization Switched-QPSK in WDM Long-Haul Transmission Systems; Journal of Lightwave Technology, IEEE Service Center, New York, NY, US, vol. 30, No. 9; May 1, 2012; pp. 1312-1318; XP011440069; ISSN: 0733-8724; DOI: 10.1109/JLT.2012.2185682.

* cited by examiner

| 4D state | QPSK 1 | QPSK 1 | QPSK 2 | QPSK 2 |
|---|---|---|---|---|
| 0 | 1+i | P11 | 1+i | P21 |
| 1 | 1+i | P11 | -1-i | P23 |
| 2 | 1-i | P14 | 1-i | P24 |
| 3 | 1-i | P14 | -1+i | P22 |
| 4 | -1-i | P13 | -1-i | P23 |
| 5 | -1-i | P13 | 1+i | P21 |
| 6 | -1+i | P12 | -1+i | P22 |
| 7 | -1+i | P12 | 1-i | P24 |

Binary Gray mapping vs Symbol mapping

| Bit stream | # State |
|---|---|
| 000 | 0 |
| 001 | 1 |
| 010 | 2 |
| 011 | 3 |
| 110 | 4 |
| 111 | 5 |
| 100 | 6 |
| 101 | 7 |

4D-8SP-QPSK

| k-th State IN \ (k-1)-th State OUT | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 0 | 1 | 2 | 3 | 4 | 5 | 6 | 7 |
| 2 | 2 | 3 | 4 | 5 | 6 | 7 | 0 | 1 |
| 3 | 2 | 3 | 4 | 5 | 6 | 7 | 0 | 1 |
| 4 | 4 | 5 | 6 | 7 | 0 | 1 | 2 | 3 |
| 5 | 4 | 5 | 6 | 7 | 0 | 1 | 2 | 3 |
| 6 | 6 | 7 | 0 | 1 | 2 | 3 | 4 | 5 |
| 7 | 6 | 7 | 0 | 1 | 2 | 3 | 4 | 5 |

(Cell values are k-th State OUT)

METHOD OF OPTICAL DATA TRANSMISSION USING POLARIZATION DIVISION MULTIPLEXING AND QPSK

FIELD OF THE INVENTION

The invention relates to a method and a device for optical data transmission using polarization division multiplexing (PDM) as well as phase modulation.

BACKGROUND

For transmitting data via an optical transmission signal it is a prominent approach to modulate the phase of the optical signal in dependence on the transmission data. One such approach of phase modulation is that of binary phase shift keying (BPSK), in which the phase of the optical signal may take on two distinct different states and wherein each of these two states represents either a 0 or a 1 of a transmission data bit. A further approach of phase modulation is that of quaternary phase shift keying (QPSK), in which the phase of the transmission signal may take on one out of four distinct different states and wherein each of such states represents two data bits of the transmission data. Thus, in QPSK the data transmission bits are mapped as sets of two transmission bits per set onto the different transmission symbols. Each of such of the four symbols is represented by a constellation point of a QPSK constellation scheme.

In order to increase the data rate of the optical transmission method it is a further prominent approach to also apply the concept of polarization division multiplexing (PDM). In PDM, a first optical transmission signal of a specific wavelength may be modulated in accordance to a QPSK modulation method and in dependence on first transmission data, wherein this first transmission signal has a first polarization state. Furthermore, a further optical transmission signal of the same wavelength, but of a polarization state that is orthogonal to the first polarization state may be modulated in accordance to a QPSK modulation method and in dependence on further transmission data. At a receiving side, the resulting overall optical transmission signal containing both of the previously mentioned transmission signals may be decomposed into two received transmission signals by taking into account polarization properties of the different optical transmission signals.

When relying on data transmission using PDM and QPSK in conjunction as previously described above, this may be conceived as a so-called four dimensional (4D) modulation format, wherein two dimensions are given by the real and the imaginary part of the QPSK symbol of the first optical signal and further two dimensions are given by the real and the imaginary part of the QPSK symbol of the second optical signal. A further prominent technique that may also be applied in addition to PDM and QPSK modulation is that of set partitioning. In set partitioning, not all the different possible states for the two combined rank symbols are used, but only a subset out of the possible states are chosen. For example, the first optical signal may take on any of the four possible symbols (or constellation points) of the QPSK constellation scheme, while the second optical signal may take on only two of the four possible symbols (or constellation points) of the QPSK constellation scheme. In other words, while a state is defined by a combination of the two chosen QPSK symbols, the number of states is reduced by allowing one of the QPSK symbols to take on only a subset of possible symbol values.

Such choice of subsets different constellation points as set partitioning on the one hand reduces the overall data rate in comparison to not applying set partitioning, since the first QPSK symbol may be used to transmit two bits per symbol via the different four constellation points of the QPSK constellation scheme, while the second QPSK symbol may be used to transmit only one bit per symbol, since the second QPSK symbol may take on only two out of the four different possible symbol values of the QPSK constellation scheme. On the other hand, such set partitioning allows to make a data transmission more robust, since the different QPSK symbol values (or constellation points) of the different QPSK symbols may be chosen, such that the Euclidean distance of the chosen QPSK symbol values to each other is maximized; thus, the QPSK symbol values or QPSK constellation points resulting from set partitioning have an overall distance to each other that is greater than when not performing set partitioning.

When transmitting data via a phase modulation method such as QPSK, the phase of the transmitted data symbol is estimated at the receiving side after a phase estimation and then corrected in a step of phase correction. Such phase correction may cause a so-called cycle-slip, also called phase-slip, wherein such a cycle-slip may results for a QPSK modulation method in a rotation of the constellation scheme by the angle of a multiple of $\pi/2$, thus causing data errors at the receiving side for the duration of the cycle-slip.

SUMMARY

Proposed is a method of optical data transmission. The method comprises different steps.

At least one stream of data bits is received.

Sets of data bits are mapped onto successive logical states, preferably according to a Gray mapping. The logical states correspond to respective sets of two initial QPSK symbols chosen according to a QPSK mapping and according to a set partitioning rule.

The logical states are differentially encoded according to a differential encoding rule.

For the differentially encoded logical states respective sets of two resulting QPSK symbols are derived according to the QPSK mapping and according to the set partitioning rule.

The encoded sets of two QPSK symbols are transmitted using polarization division multiplexing.

The differential encoding rule results in a differential encoding of one of the initial QPSK symbols but not the other of the initial QPSK symbols.

To grasp the advantages of the proposed method, the following aspects have to be taken into consideration.

As mentioned previously above, it is a prominent approach to combine the techniques of QPSK, PDM as well as set partitioning for transmission via an optical data signal. Due to the fact, that the data transmission may be disturbed by the occurrences of cycle-slips, differential encoding at the receiving side and differential decoding at the receiving side is needed to prevent successive data errors caused by such cycle slips. On the one hand, for the occurrence of a cycle slip at one time instance and a persistence of this cycle slip for further multiple successive time instances, the technique of differential encoding and differential decoding allows to remove data errors for most of the multiple successive time instances. This is obtained by the price of a data error occurring after differential decoding at that time instances, at which the cycle slip occurs as well as the single one next successive time instance. For the further following time instances, the method of differential encoding and decoding removes the data errors. These resulting errors after differential decoding for the mentioned two time instances are an effect that is also called error multiplication.

The proposed method allows to use the techniques of QPSK, PDM and set partitioning in conjunction in a manner, which makes it possible to rely on differential decoding in the form of iterative demapping using soft decision decoding at a receiving side for compensating transmission errors caused by the previously mentioned error multiplication. Thus, the chosen way of carrying out the differential encoding of the transmitted data symbols proposed herein is of clear advantage, since with this differential encoding, the differential decoding may still be carried out by an iterative demapper using an algorithm such as the BCJR algorithm.

The exact design and the exact behavior according to different embodiments will be described in detail later on.

BRIEF DESCRIPTION OF THE FIGURES

FIG. 8a shows the chosen states as already shown in FIG. 7a.

DESCRIPTION OF EMBODIMENTS

Figure 1:
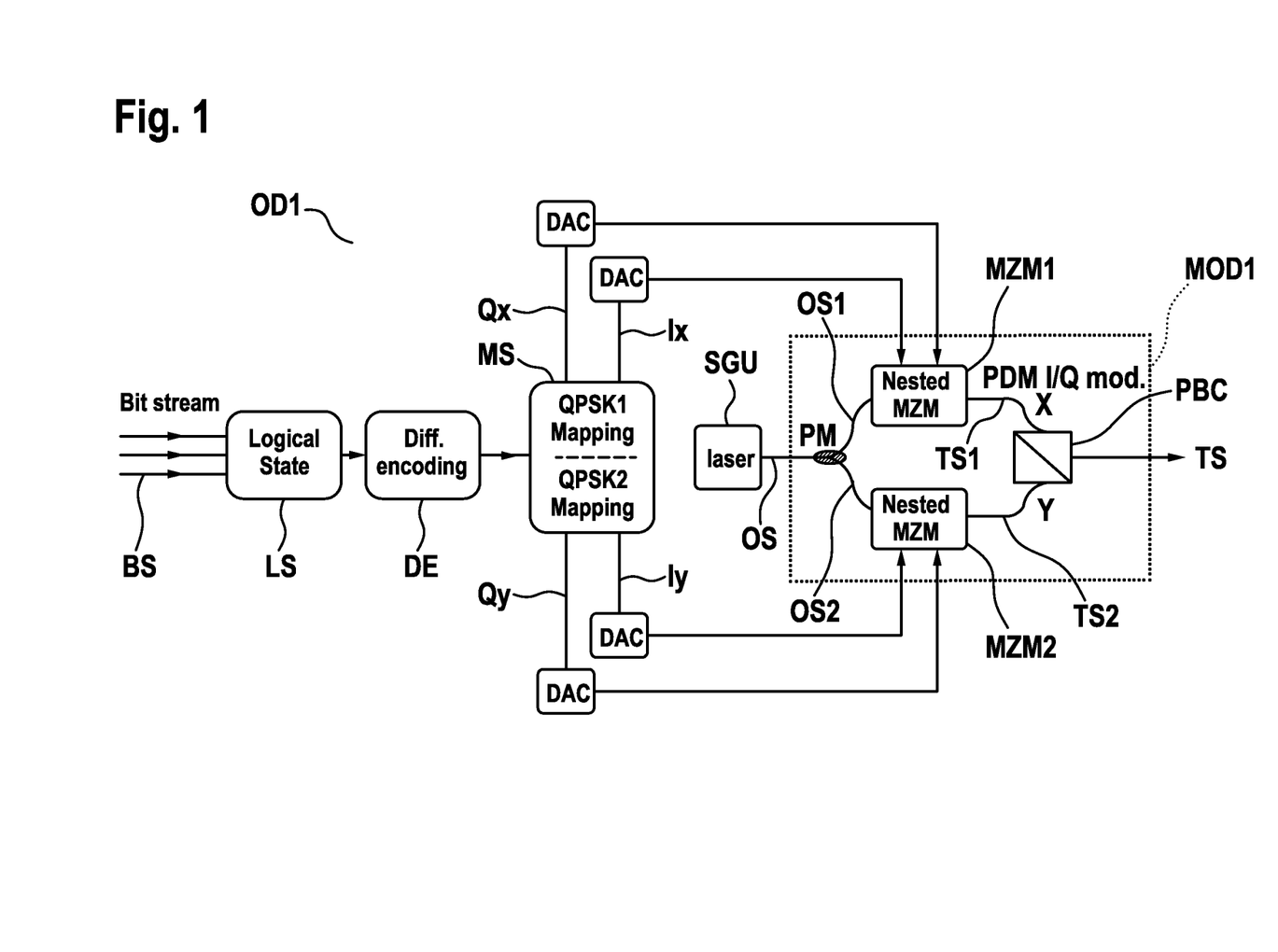
FIG. 1 shows a proposed device for optical data transmission according to a first embodiment.
Figure 9A:
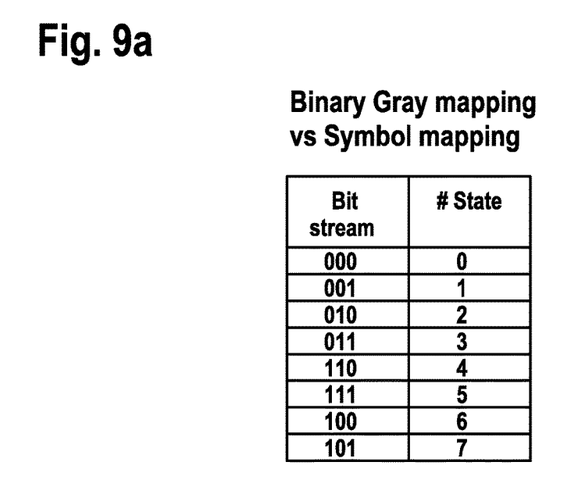
FIG. 9a shows values for a Gray mapping of data bits onto the different states.

FIG. 1 shows an optical transmission device OD1, which receives a bit stream BS, wherein the device OD1 maps a set of three bits onto a corresponding state in a step LS. This mapping of three data bits is preferably performed as indicated in FIG. 9a. FIG. 9a shows a table, according to which a so-called binary Gray mapping of data bits in a set of three bits is performed onto a state taking on one out of the values of the range 0 to 7.

Coming back to FIG. 1, each of the derived states is differentially encoded in the step DE. This step of differential encoding DE will be described in detail later on.

The state resulting from the step of differential encoding DE is then transmitted, by deriving from the differentially encoded state value a corresponding first QPSK symbol QPSK1 and also a corresponding second QPSK, symbol QPSK2 in a mapping step MS. This mapping will be described in detail with regard to the FIGS. 2a to 2c later on.

In accordance to the chosen first QPSK symbol QPSK1 a corresponding in-phase signal component Ix and a corresponding quaternary signal component Qx is generated, which then are converted by respective digital analogue converters DAC to electrical signals; these signals are then provided to a Mach-Zehnder modulator MZM1 of a modulation unit MOD1. Furthermore, according to the chosen second QPSK symbol QPSK2 a corresponding in-phase signal component Iy and a corresponding quadrature component Qy are generated and provided to respective digital analogue converters DAC, which generate corresponding electrical signals; these signals are then provided to another Mach-Zehnder modulator MZM2 of the modulation MOD1.

The modulation unit MOD1 receives an optical signal OS from a signal generation unit SGU. The modulation unit MOD1 contains a polarization multiplexer PM, that generates from the signal OS respective optical signals OS1, OS2 of respective polarization states, that are orthogonal to each other, to the different Mach-Zehnder modulators MZM1 and MZM2. The Mach-Zehnder modulators MZM1 and MZM2 then modulate the respective optical signals OS1 and OS2 of orthogonal polarization states using the respective signal components Ix, Qx and Iy, Qy. The resulting transmission signals TS1 and TS2 are then combined at a polarization beam combiner PBC for yielding the overall optical transmission signal TS.

Figure 2A:
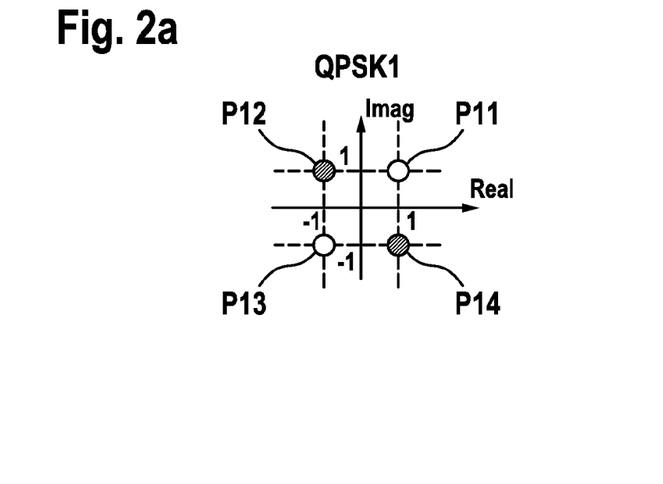
FIGS. 2a, b and c show representations of QPSK symbols according to the first embodiment.
Figure 2B:
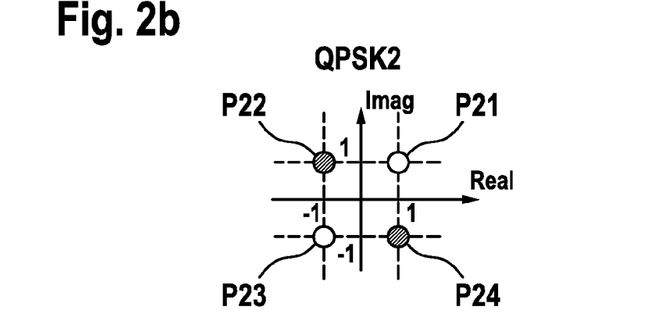

FIGS. 2a and 2b indicate respective constellation points for the different QPSK symbols QPSK1 and QPSK2. As previously outlined, a set of bits contains three data bits, as shown in the Table of FIG. 9a. With regard to such a set of three bits, the two leftmost bits may be interpreted as the two most significant bits (MSB). Coming now back to FIGS. 2a and 2b: For indicating these two bits out of the three data bits that are to be transmitted, the first symbol QPSK1 may take on any of the constellation points shown in FIG. 2a. Set partitioning is carried out, in that for a given choice of the first symbol QPSK1 the second symbol QPSK2 may take on only two out of the four possible constellation points, shown in FIG. 2b, at the same time instance.

FIG. 9a shows a mapping of a set of three data bits to be transmitted at a same time instance by the two symbols QPSK1 and QPSK2. The mapping of the data bits to a decimal state number is indicated in the table in FIG. 9a. Via the Gray mapping, the two most significant bits of a set of data bits are to be indicated by the first symbol QPSK1. Thus, the state 0 is to be indicated by the point P11 of FIG. 2a, while distinguishing between the state 0 and the state 1 is possible by choosing either the point P21 or the point P23 of the second symbol QPSK2 of FIG. 2b. Thus, the least significant bit of the set of data bits is indicated by the choice of the symbol QPSK2. Set partitioning is carried out, in that a choice of either the point P11 or the point P13 of the symbol QPSK1 allows only a choice of either the point P21 or the point P23 of the symbol QPSK2. Furthermore, when choosing either the point P12 or the point P14 of the symbol QPSK1, this allows only a choice of either the point P22 or the point P24 for the symbol QPSK2 in FIG. 2b. The exact choice of the different constellation points for the different symbols QPSK1 and QPSK2 for such Gray mapping is indicated in FIG. 7b in detail, wherein the variable i indicates the imaginary number.

In other words, the two most significant bits are indicated by the choice of the constellation point (or symbol value) for the first symbol QPSK1, while the least significant bit as the third bit is indicated by the choice of the constellation point (or symbol value) for the second symbol QPSK2.

Figure 2C:
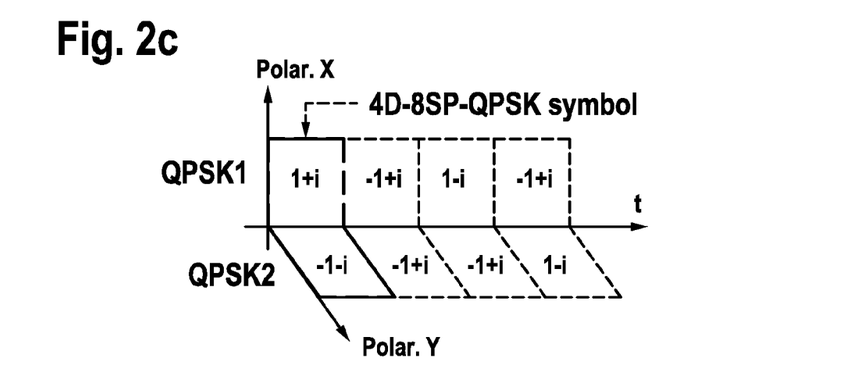

FIG. 2c indicates over the time t possible combinations of chosen constellation points (or symbol values) for the different symbols QPSK1 and QPSK2 at same time instances, wherein the symbol QPSK1 is transmitted in an x polarization plane, while the symbol QPSK2 is transmitted in a y polarization plane. In other words, transmission of a set of three data bits is carried out using the transmission of two different QPSK symbols at a same time instance, wherein the four dimensional QPSK symbol is restricted by set partitioning reducing the choice overall symbols to eight different symbol combinations (or eight different symbol states).

Figure 7A:
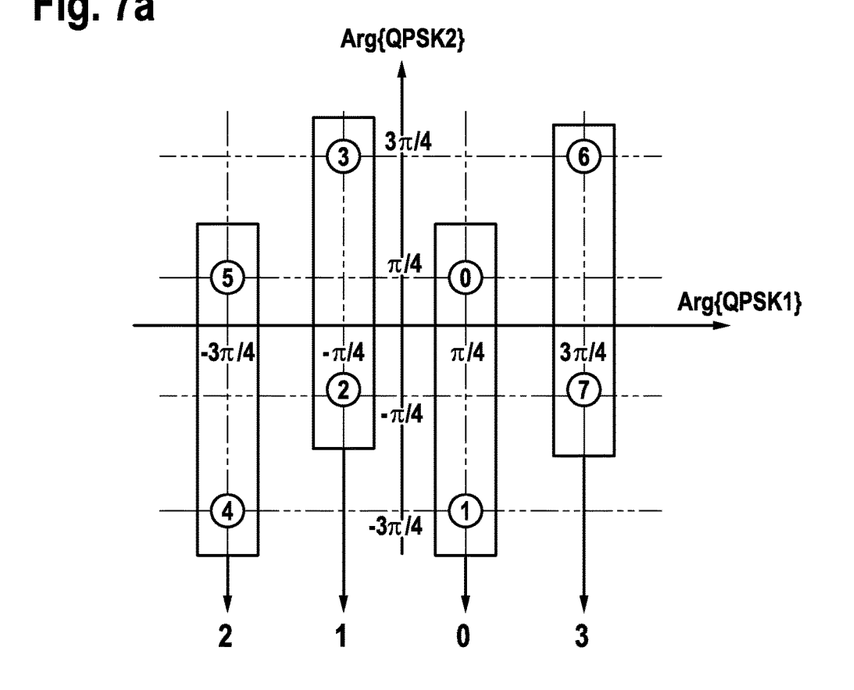
FIG. 7a shows a representation of a mapping of QPSK symbols according to a chosen set partitioning.
Figure 7B:
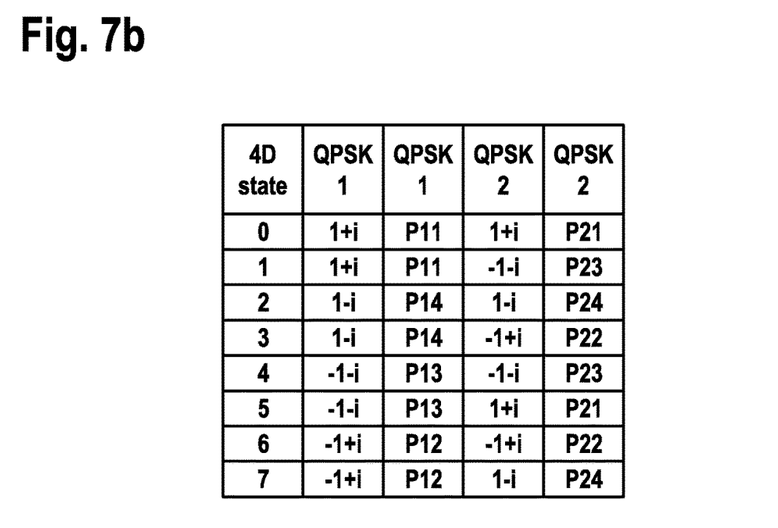
FIG. 7b shows QPSK symbol values for states according to the chosen set partitioning.

FIG. 7a shows a representation of the chosen mapping in conjunction with the chosen set partitioning. One may interpret a set of two QPSK symbols as the set of QPSK1 and QPSK2 as a four-dimensional QPSK symbol; furthermore, assuming same amplitudes for both QPSK symbols QPSK1 and QPSK2, FIG. 7a can be interpreted as a two-dimensional representation of four-dimensional QPSK symbols. The QPSK symbols QPSK1, QPSK2 may on take four discrete values for the phases, namely $-3\pi/4$, $-\pi/4$, $+\pi/4$, $3\pi/4$. The states $0, \ldots, 7$ are shown in dependence on the phase values (Arg{ }) of their corresponding QPSK symbols QPSK1 and QPSK2. It can be clearly seen, that two states, as for example the states 0 and 1, which share same two most significant bits form a group of states, for which the phase of the first symbol QPSK1 is the same, while for these two symbols of this group the phase of the second symbol QPSK differs. For the given choice of mapping and set partitioning, two states having a same phase value for the first symbol QPSK1 have a difference in their phase value of the second symbol QPSK2, which is a difference of $\pi$. These states have a common group or quadrant index, in this example the index 0. Similar considerations hold for the other sets of states, as it can be seen from the FIG. 7a.

To summarize the constellation of the states as indicated in the FIG. 7a, the different four dimensional symbols, given by the combination of the QPSK symbols QPSK1 and QPSK2, are separated into four groups or sets of symbols, wherein these sets are shifted from one another by a phase difference of the magnitude of $\pi/2$ with regard to the first symbol QPSK1. For a given state number $X=0, \ldots, 7$, the set index Z is given as $$Z=[X-\mathrm{mod}(X,2)]/2 \in \{0,1,2,3\}$$

Indices of the sets of states are indicated on the lower hand side of FIG. 7a. For each of the sets $0, \ldots, 3$, the respective states have a phase difference of $\pi$ with regard to the second symbol QPSK2, while they share a same phase with regard to the first symbol QPSK1. Furthermore, all states differ from any of their next neighboring states by a phase difference of $\pi/2$ with regard to the first symbol QPSK1, while they also differ from their next neighboring states by a phase difference of $\pi/2$ with regard to the second symbol QPSK2.

Figure 8A:
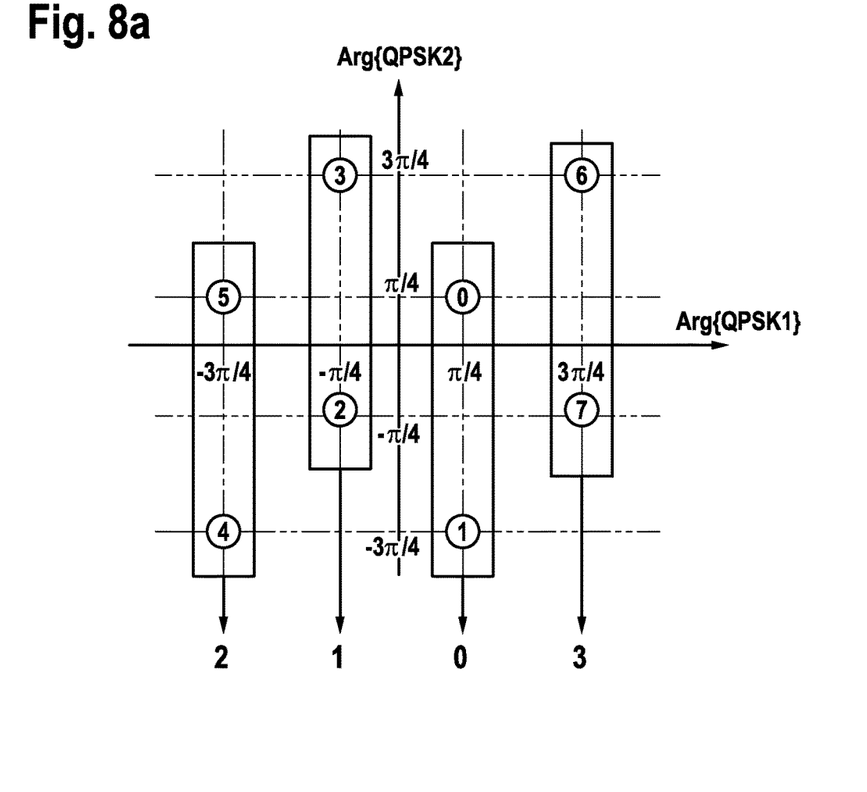
Figure 8B:
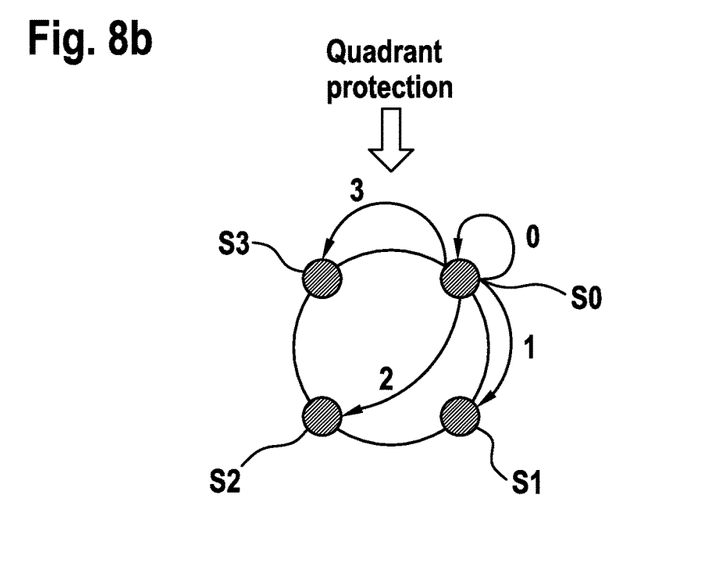
FIG. 8b shows a state machine representing differential encoding of the different states.

FIG. 8a shows the mapping of the different states as previously described with regard to FIG. 7a. Furthermore, FIG. 8b shows a state machine, which illustrates the effect of the chosen rule for differential encoding onto the states and their respective sets of indices $0, \ldots, 3$. Such differential encoding is of advantage in the case, that cycle-slips are to be expected during the optical data transmission.

The chosen differential encoding rule is now explained in detail. Assuming a time discrete sequence of states X with the index k, differential encoding is performed by deriving the resulting output value Xout(k) using the output value Xout(k−1) of the previous time instance and the input value X(k) of the current time instance. As previously mentioned, a state value X represents one of the state numbers $0, \ldots 7$.

The differential encoding rule is given by $$X\mathrm{out}(k)=2*\mathrm{mod}\{\{[X\mathrm{out}(k-1)-\mathrm{mod}(X\mathrm{out}(k-1),2)]/2+ [X\mathrm{in}(k)-\mathrm{mod}(X\mathrm{in}(k),2)]/2\},4\}+\mathrm{mod}(X\mathrm{in}(k),2)$$

Figure 11:
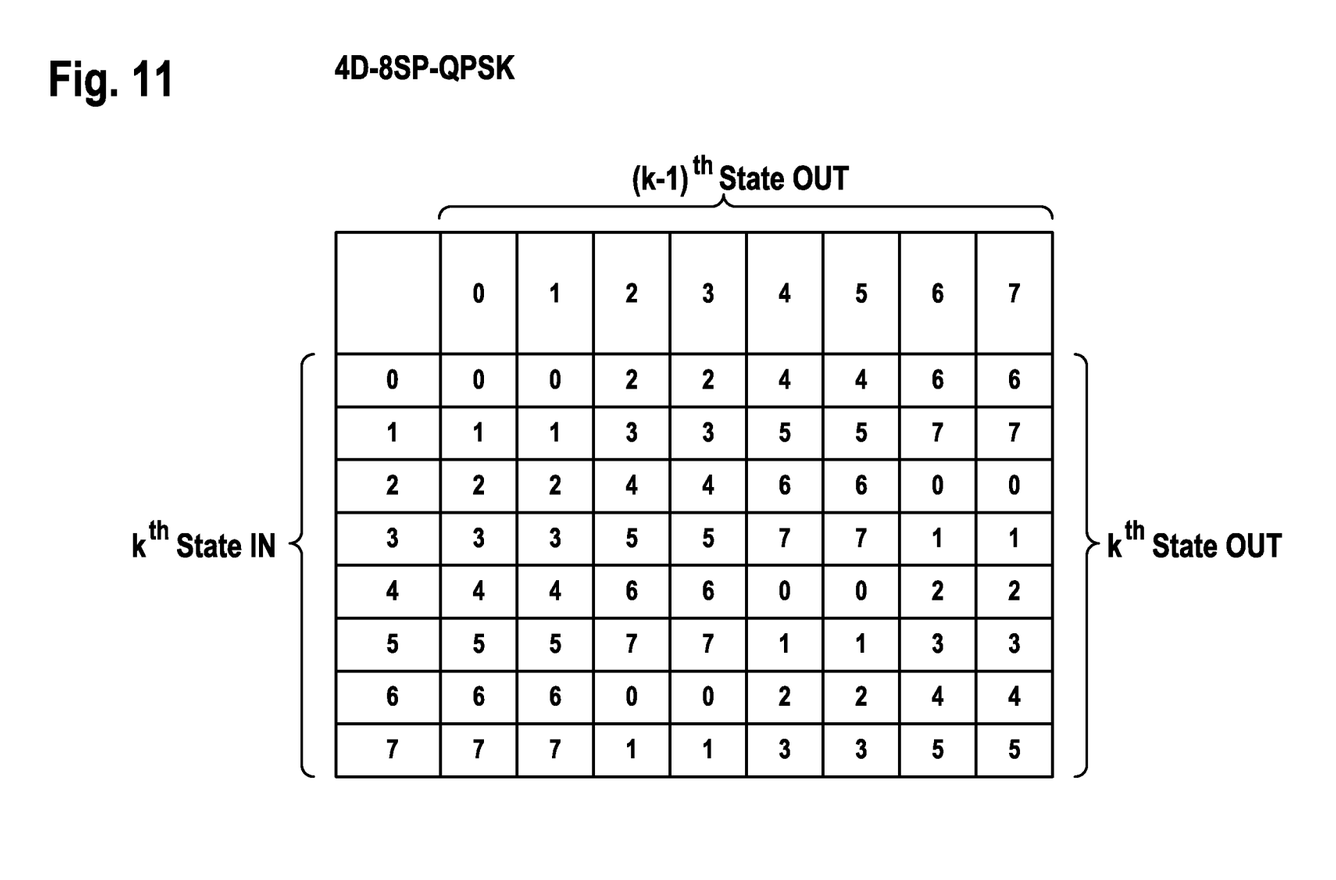
FIG. 11 shows a table for input and output values of the chosen differential encoding scheme.

Exact values for this encoding rule are indicated in the table of FIG. 11.

The effect of the chosen differential encoding rule is now described with regard to FIG. 8a. FIG. 8b shows a transition from one of the sets of index $Z=0, \ldots, 3$ for the differential encoding rule for the example, that at a given time instance a state of the set with the index Z=0, indicated as S0, has been transmitted at the previous time instance. In the case, that the next state of the next occurring time instance is from the set of the index 1, the differential encoding rule results in a transition from the set with the index 0 to the set of the index 1. Further transitions can be seen in the illustration of FIG. 8b. To summarize the given differential encoding rule, this rule protects the first symbol QPSK1 of one time instance with regard to a next symbol QPSK1 of a next successive time instance against a phase rotation or phase slip by a multiple of $\pi/2$. The second symbol QPSK2 is not protected by this differential encoding rule. The advantage of the choice of such encoding rule lies in the fact, that the differentially encoded symbols may be used at a receiving side for iterative demapping by a soft decision decoder for compensating lots of differential encoding caused by possible error multiplication. This is possible due to the fact, that only the symbol QPSK1 is differentially encoded, while the symbol QPSK2 is not differentially encoded.

Figure 10:
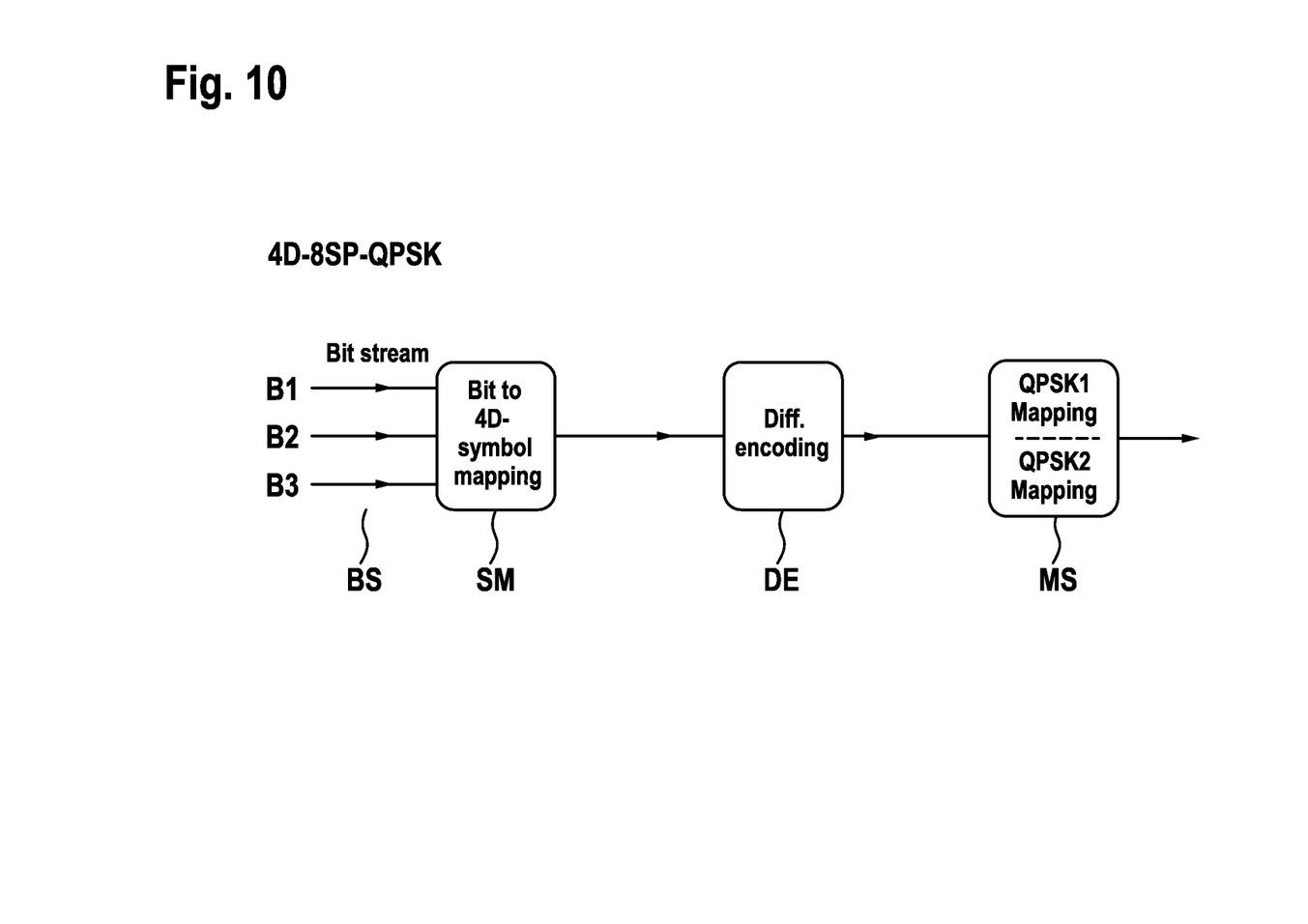
FIG. 10 shows a general block schematic for differential encoding of transmission bits.

FIG. 10 shows general steps carried out at the transmission device of in FIG. 1. The bit stream of three data bits BS with the bits B1, B2, B3 has to be mapped into respective state numbers in the step of symbol mapping SM. This results in respective states of state numbers $0, \ldots, 7$. Next, the resulting state values are differentially encoded in the step DE as previously described above. The resulting differentially encoded state values are then provided to the step of mapping MS, where respective pairs of QPSK symbols QPSK1 and QPSK2 are generated. The step SM of symbol mapping M corresponds to the step of logical state LS of FIG. 1.

Figure 9B:
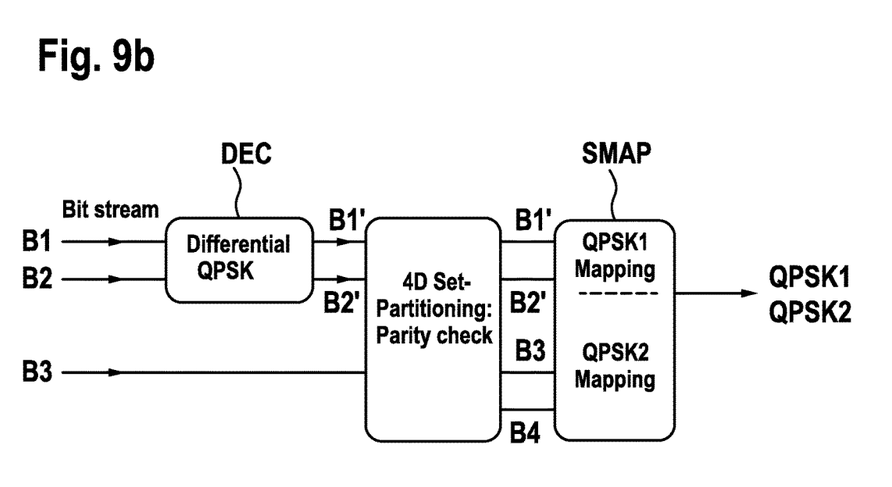
FIG. 9b shows an implementation of differential encoding.

Preferably, the general steps provided in FIG. 10 are carried out as indicated in FIG. 9b. The received bits B1, B2, B3 are used in the following manner. The two bits B1 and B2 as the most significant bits are provided to a standard step of differential QPSK encoding indicated as DEC, while the resulting output values B1' and B2' are provided together with the third bit B3 to a step PC, which performs a parity check on the set of bits B1', B2', B3. The resulting parity check bit B4 is then provided together with the other bits B3, B2' and B1' to a standard mapping step SMAP, which corresponds to the mapping step MS of FIG. 1 or FIG. 10. Herein, the bits B1' and B2' are mapped onto the QPSK1 symbol and the bits B3 and B4 are mapped onto the QPSK2 symbol. The resulting symbols QPSK1 and QPSK2 are then used for modulation as previously described with regard to FIG. 1. Encoding the information differentially can here be understood as using the first and the second most significant bits to encode k-times $\pi/2$ phase rotation for QPSK constellation at the lowest significant bit encodes for the symbol parity.

To summarize the above, the encoding performed as proposed herein allows to use a total of eight independent four dimensional symbols, wherein each of the symbols can encode three bits. This technique allows a reuse of most hardware required for common two dimensional formats.

Figure 3:
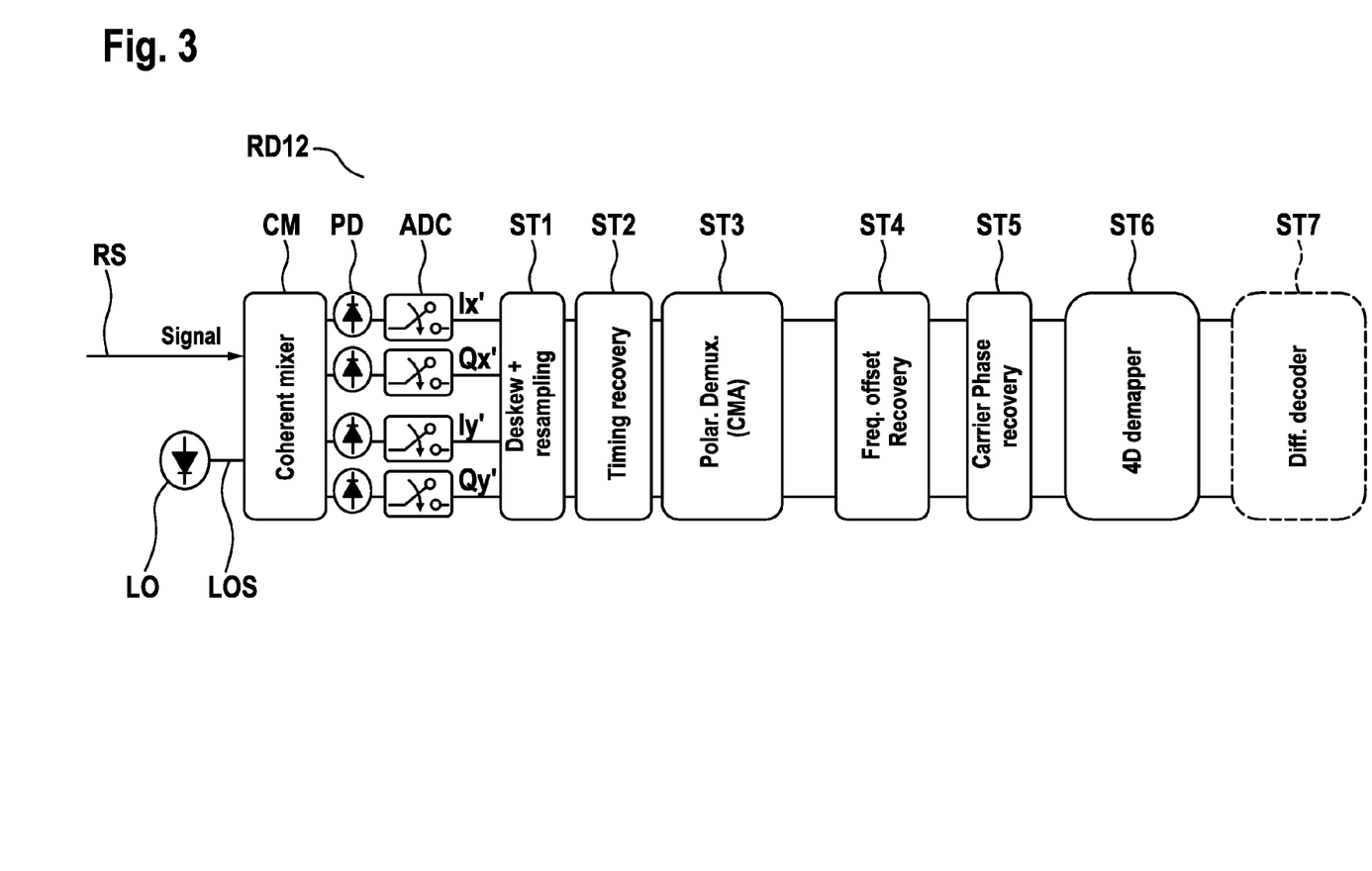
FIG. 3 shows a receiving device for the first embodiment.

FIG. 3 shows a receiving device RD12 that may be used in the case, that data transmission has been carried out by a transmission device OD1 as described with regard to FIG. 1.

The received optical signal RS is mixed with the local oscillator signal LOS, provided by local oscillator LO, within a coherent mixer CM, which provides electrical signals to respective photo diodes PD. The resulting electrical signals provided by the photo diodes PD are then sampled by respective analogue digital converters ADC, leading to an estimated in-phase signal component Ix' and an estimated quadrature signal component Qx' for the first polarization plain as the x polarization plain. Furthermore, this leads to an in-phase signal component Iy' as well as a quadrature signal component Qy' for the second polarization plane as the y polarization plane.

In a processing step ST1, deskewing and resampling is carried out, while in a step ST2 timing recovery is obtained. Within the step ST3, polarization demultiplexing is carried out using the CMA algorithm, which is the Constant Modulus Algorithm.

Furthermore, frequency recovery is performed in the step ST4, while carrier phase recovery is performed in the step ST5. The resulting signals are then used in a four dimensional demapper ST6 and a differential decoder ST7.

By using the proposed differential encoding rule, using the demapper of step ST6 and the differential decoder ST7 may be carried out, while the differential encoding in the step ST7 can be realized as an iterative demapping step with soft decision decoding.

It has to be noted, that for the given implementation illustrated in FIG. 3, it is important that the step ST4 of frequency offset recovery and ST5 of carrier phase recovery have to be jointly performed on all the values of both polarizations for the given implementation.

Figure 4:
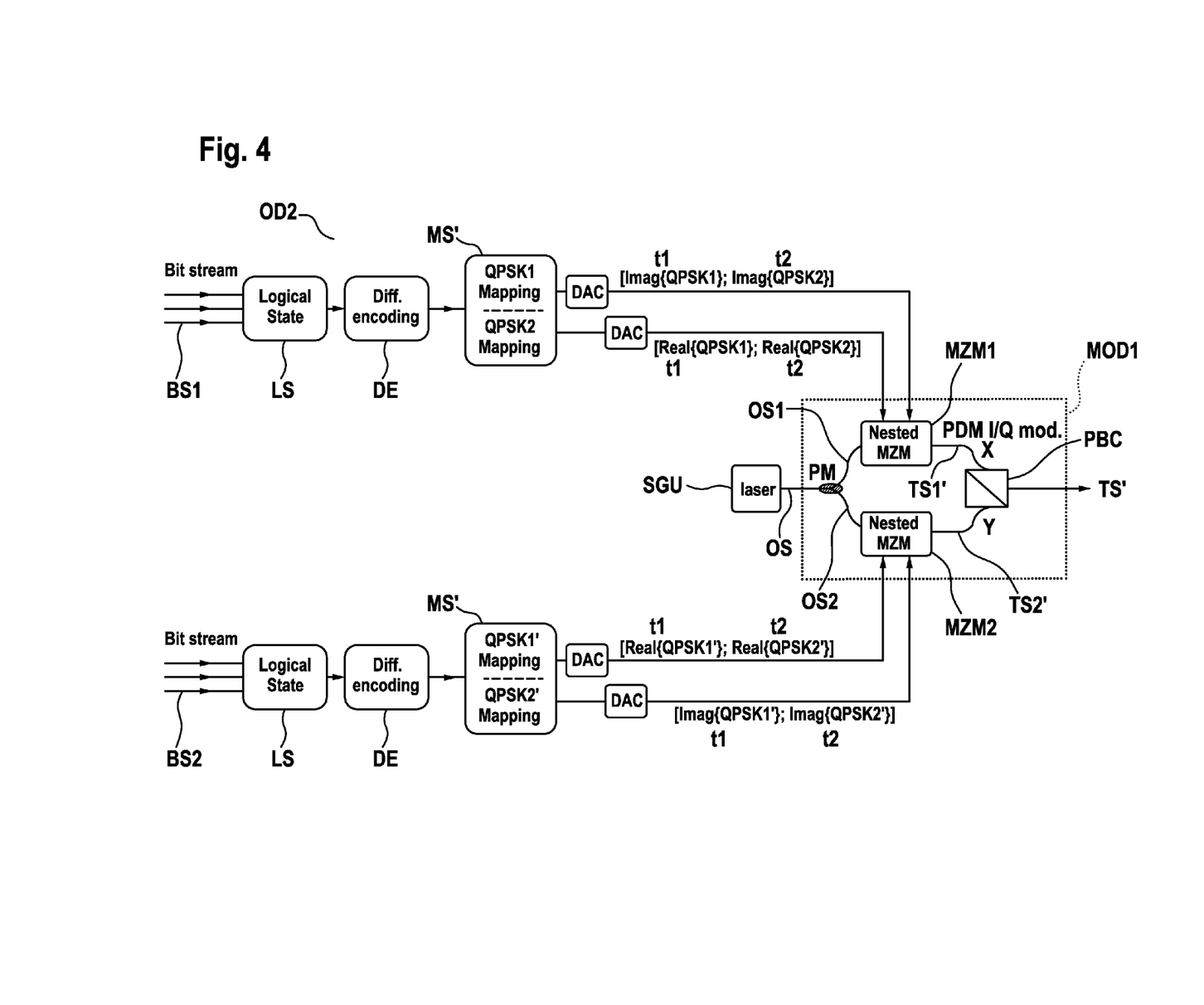
FIG. 4 shows an optical transmission device according to a second embodiment.

FIG. 4 shows an alternative transmitting device OD2 according to a second embodiment.

A bit stream BS1 of three bits is mapped in a logical state step LS2 to one out of the possible states 0, . . . , 7 as previously described. In the step DE, differential encoding is carried out as previously described, while the step MS performs mapping of the resulting states provided by the differential encoder DE onto respective symbols QPSK1 and QPSK2. The resulting symbol values are then converted by digital analogue converters DAC to respective electrical values representing the respective symbols QPSK1 and QPSK2. In this embodiment, mapping is carried out, in that at a first time instance T1 the real and the imaginary component of the first symbol QPSK1 are given, while at a next time instance T2 the real and the imaginary component of the second symbol QPSK2 are given. In other words, the implementation shown in FIG. 4 differs from the implementation of FIG. 1 in that the symbol QPSK1 and the symbol QPSK2 are not provided and transmitted via respective polarized optical signals at a same time instance, but transmitted at consecutive time instances t1 and t2 via one same optical signal of one same polarization state. The symbols QPSK1 and QPSK2 with their real and imaginary components are then provided to a modulation unit MOD1 as previously described with regard to the FIG. 1. This results in a first polarized optical transmission signal TS1'.

Another bit stream BS2 is received and subject to logical state mapping LS as well as differential encoding DE and mapping in a mapping step MS, wherein the mapping step MS provides resulting symbols QPSK1' and QPSK2' that are independent of the symbols QPSK1 and QPSK2, but may be considered as same kinds of symbols with the same mapping as previously described with regard to the FIGS. 2, 7 and 8 for the symbols QPSK1 and QPSK2. Thus, the resulting real and imaginary component symbols QPSK1' and QPSK2' are then provided to the modulation unit MOD1 for transmitting these symbols at consecutive time instances t1 and t2 via a resulting signal TS2'. The signal TS2' is combined with the signal TS1' for yielding the overall transmission signal TS'.

Figure 5A:
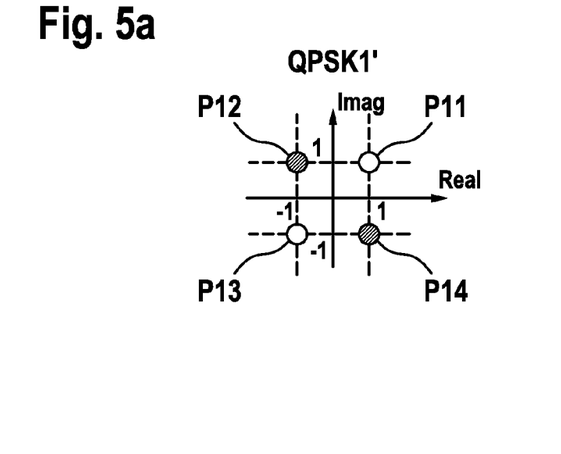
FIGS. 5a, b and c show representations of QPSK symbols according to the second embodiment.
Figure 5B:
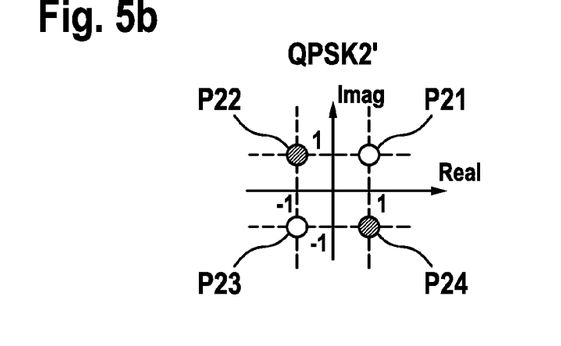

FIG. 5a shows the choice for the symbol values of QPSK1', while FIG. 5b shows the choice for the symbol values of QPSK2'. These choices have to be considered with regard to the mapping of different symbols as previously described with regard to the FIGS. 7a and 7b.

Figure 5C:
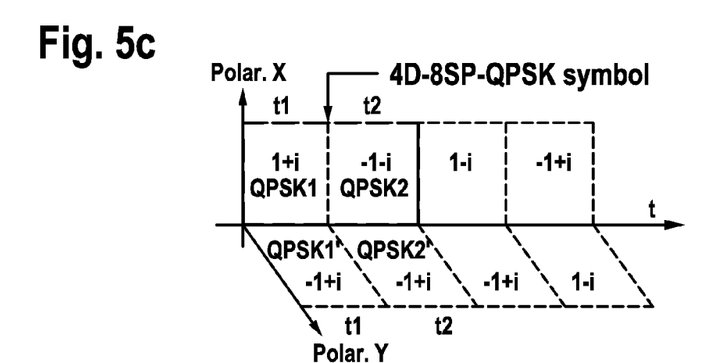

FIG. 5c indicates the transmission of the symbol QPSK1 at the time instance t1 on the signal of the polarization plane x and the transmission of the symbol QPSK2 at the next time instance t2 on the same signal with the polarization plane x.

Figure 6:
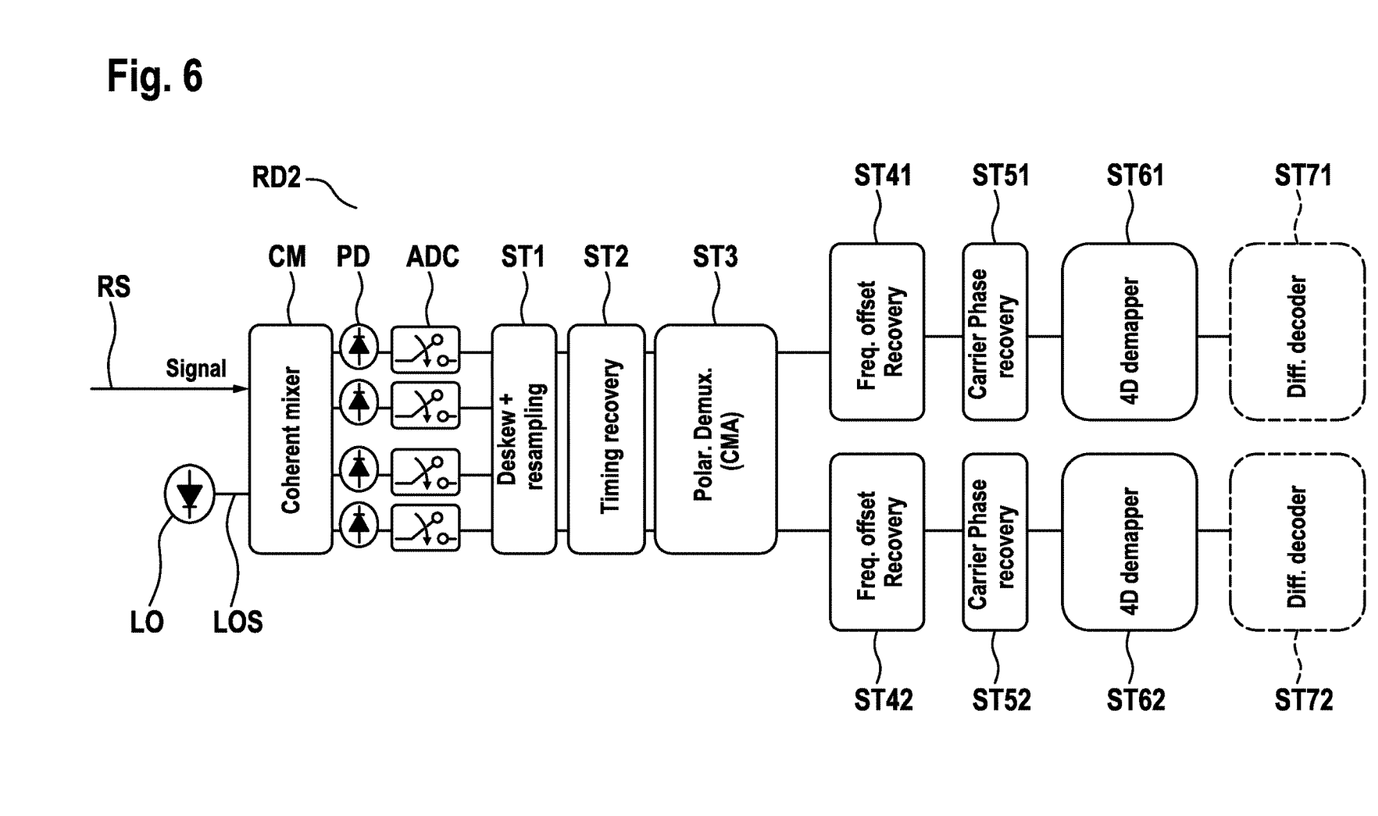
FIG. 6 shows a receiving device for the second embodiment.

FIG. 6 shows a proposed receiving device RD2 according to the second embodiment. The receiving device RD2 of FIG. 6 differs from the receiving device previously described with regard to FIG. 3, in that the processing steps ST4, ST5, ST6 and ST7 are carried out not jointly but as separate steps. For example, frequency offset recovery does not have to be carried out for both transmitted polarization state signals together but may be carried out independently. Same applies for carrier phase recovery as well as for de-mapping and differential decoding.

Different processing steps have been explained in detail with regard to the FIGS. 1 to 11. The transmission devices OD1 and OD2 of the FIGS. 1 and 4 are operable to carry out such processing steps.

The invention claimed is:

1. Method of optical data transmission,
comprising:
    receiving at least one stream of data bits,
    mapping sets of said data bits onto successive logical states, wherein said logical states correspond to respective initial sets of two initial quadrature phase shift keying (QPSK) symbols chosen according to a QPSK mapping and according to a set partitioning rule,
    differentially encoding said logical states according to a differential encoding rule,
    deriving for said differentially encoded logical states respective sets of two resulting QPSK symbols according to said QPSK mapping and according to said set partitioning rule, and
    transmitting said encoded sets of two QPSK symbols using polarization division multiplexing (PDM),
    wherein said differential encoding rule causes a differential encoding of an initial set of QPSK symbols such that a first initial QPSK symbol of said initial set is differentially encoded but not the other initial QPSK symbol of said initial set.

2. Method according to claim 1,
wherein said differential encoding rule results in a differential encoding of said first initial QPSK symbol for protecting said first initial QPSK symbol against a phase rotation by a multiple of $\pi/2$.

3. Method according to claim 2,
wherein said phase rotation is a cycle slip.

4. Method according to claim 1,
wherein said set partitioning rule maximizes an Euclidean distance for the QPSK symbols chosen according to said set partitioning rule.

5. Method according to claim 4,
wherein according to said set partitioning rule for a given choice of a constellation point for a first QPSK symbol of a set of QPSK symbols the second QPSK symbol of said set of QPSK symbols may take on only one out of two possible constellation points.

6. Method according to claim 1,
wherein a set of data bits contains three data bits (B1, B2, B3).

7. Method according to claim 6,
wherein the two most significant bits of said set of three bits are indicated by a choice of the first QPSK symbol (QPSK1), while the least significant bit of said set of three bits is indicated by the choice of the other QPSK symbol (QPSK2).

8. Method according to claim 1,
wherein the first encoded QPSK symbol (QPSK1) is transmitted at a first time instance using a first optical PDM signal (TS1) having a first polarization state,
and wherein the second encoded QPSK symbol is transmitted at said first time instance using a second optical PDM signal (TS2) having a second polarization state that is orthogonal to said first polarization state.

9. Method according to claim 1,
wherein the first encoded QPSK symbol is transmitted at a first time instance using a first optical PDM signal (TS1') having a first polarization state,
and wherein the second encoded QPSK symbol is transmitted at a next successive time instance using a said first optical PDM signal (TS1').

10. Optical transmission device,
wherein said device is operable to
receive at least one stream (BS) of data bits (B1, B2, B3),
map sets of said data bits onto successive logical states, wherein said logical states correspond to respective initial sets of two initial QPSK symbols chosen according to a QPSK mapping and according to a set partitioning rule,
differentially encode said logical states according to a differential encoding rule,
derive for said differentially encoded logical states respective sets of two resulting QPSK symbols (QPSK1, QPSK2) according to said QPSK mapping and according to said set partitioning rule,
transmit said encoded sets of two QPSK symbols using polarization division multiplexing,
wherein said devices uses a differential encoding rule causing a differential encoding of an initial set of QPSK symbols such that first initial QPSK symbol of said initial set is differentially encoded but not the other initial QPSK symbol of said initial set.

* * * * *